United States Patent
Wright et al.

(10) Patent No.: US 12,512,686 B2
(45) Date of Patent: *Dec. 30, 2025

(54) SYSTEMS AND METHODS FOR ALERTING USERS TO DEVICE LOW BATTERY STATES

(71) Applicant: Zebra Technologies Corporation, Lincolnshire, IL (US)

(72) Inventors: Mariya Wright, Cortland Manor, NY (US); John P. Evans, Levittown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/278,979

(22) PCT Filed: Jan. 18, 2022

(86) PCT No.: PCT/US2022/012799
§ 371 (c)(1),
(2) Date: Aug. 25, 2023

(87) PCT Pub. No.: WO2022/182442
PCT Pub. Date: Sep. 1, 2022

(65) Prior Publication Data
US 2024/0135799 A1 Apr. 25, 2024
US 2024/0233510 A9 Jul. 11, 2024

Related U.S. Application Data (63) Continuation of application No. 17/184,724, filed on Feb. 25, 2021, now Pat. No. 11,210,924.

(51) Int. Cl.
*H02J 7/00* (2006.01)
*G08B 7/06* (2006.01)
*G08B 21/18* (2006.01)

(52) U.S. Cl.
CPC .............. *H02J 7/0047* (2013.01); *G08B 7/06* (2013.01); *G08B 21/182* (2013.01); *H02J 7/00* (2013.01);
(Continued)

(58) Field of Classification Search
CPC ...... G08B 21/182; G08B 21/00; G08B 21/18; H02J 7/0048; H02J 13/00002;
(Continued)

(56) References Cited

U.S. PATENT DOCUMENTS 6,472,988 B1 * 10/2002 Feld ................. A62B 9/006
600/534
2011/0215752 A1 * 9/2011 Waters ................. H02J 7/0013
320/101
(Continued)

FOREIGN PATENT DOCUMENTS

EP 3084554 B1 * 3/2022 ........... G06F 1/1632
JP 2004056555 * 2/2004 ............. Y02D 30/70

OTHER PUBLICATIONS

International Search Report and Written Opinion for International Application No. PCT/US2022/012799 mailed on Feb. 4, 2022.

*Primary Examiner* — Van T Trieu
(74) *Attorney, Agent, or Firm* — Yuri Astvatsaturov (57) ABSTRACT

Methods and systems for alerting a user to a device low battery state are disclosed herein. An example method includes receiving, at a charging station for a scanning device, a notification from the scanning device when the scanning device is not coupled to the charging station indicating that the scanning device has entered a low battery state. The scanning device may be communicatively coupled to the charging station by a wireless communication protocol. Further, the example method may include generating, by the charging station, an indication of the low battery state of the scanning device based upon the notification. The
(Continued)

example method may also include displaying, by the charging station, the indication for a user.

20 Claims, 5 Drawing Sheets

(52) U.S. Cl.
CPC ......... *H02J 7/0048* (2020.01); *H02J 7/00034* (2020.01)

(58) Field of Classification Search
CPC ........ H02J 7/0047; H02J 7/00034; H02J 7/00; H02J 7/04; B60L 58/26; B60L 50/64; B60L 53/10; B60L 53/12; B60L 53/16; B60L 53/62; B60L 53/65; G01N 33/00; G01R 31/371; G01R 31/382; G01R 31/396; G05D 1/00; G05D 1/02; G05D 1/0291; G06Q 10/00; G06Q 10/02
See application file for complete search history.

(56) References Cited

U.S. PATENT DOCUMENTS

| | | | |
|---|---|---|---|
| 2014/0350716 | A1 | 11/2014 | Fly et al. |
| 2016/0224064 | A1* | 8/2016 | Fleisig .................... G06F 1/266 |
| 2017/0240061 | A1 | 8/2017 | Waters |
| 2019/0023140 | A1* | 1/2019 | Kim ........................ B60L 53/12 |
| 2020/0412133 | A1 | 12/2020 | Baldasare et al. |
| 2021/0245627 | A1* | 8/2021 | Ferguson ............. G05D 1/0291 |
| 2023/0406132 | A1* | 12/2023 | Pisarenko ............... B60L 53/62 |

* cited by examiner

SYSTEMS AND METHODS FOR ALERTING USERS TO DEVICE LOW BATTERY STATES

BACKGROUND

Cordless devices dependent upon battery technology such as lithium ion batteries, lithium ion super capacitors, and electrical double layer capacitor (ELDC) super capacitors have risen to prominence in recent decades. However, the viability of these devices, is dependent on the ability of the user to keep the battery assemblies of the cordless devices sufficiently charged for operation.

These cordless devices typically include a charging cable or charging station configured to charge the battery assembly, but user(s) often neglect to attach/couple the cordless device for charging at the end of a work session. As a result, many user(s) experience their cordless devices running out of charge during a work session, which can result in wasted time and labor resources. Moreover, many user(s) leave cordless devices at a location other than the charging cable/station and do not use the cordless device for several days. Thus, the user will not know that the cordless device battery is running low on charge until the user decides to use the cordless device again and manages to locate the cordless device.

Accordingly, there is a need for a way to alert a user that a cordless device has entered a low battery state.

SUMMARY

In one embodiment, the present invention is a method for alerting a user to a device low battery state. The method includes receiving, at a charging station for a scanning device, a notification from the scanning device when the scanning device is not coupled to the charging station indicating that the scanning device has entered a low battery state, wherein the scanning device and the charging station are communicatively coupled by a wireless communication protocol. The method further includes generating, by the charging station, an indication of the low battery state of the scanning device based upon the notification. The method further includes displaying, by the charging station, the indication for a user.

In a variation of this embodiment, the scanning device and the charging station are directly communicatively coupled by a wireless communication protocol.

In another variation of this embodiment, displaying the indication for the user further comprises transmitting, by the charging station, the indication to a workstation of the user; and displaying, on an interface of the workstation, the indication for the user. Further in this variation, displaying the indication for the user on the interface of the workstation further comprises automatically presenting, on the interface of the workstation, an option for the user to activate a locationing feature of the scanning device.

In yet another variation of this embodiment, indication includes at least one of (i) a visual indication component, (ii) an audio indication component, or (iii) a haptic indication component.

In still another variation of this embodiment, the low battery state corresponds to the scanning device having less than or equal to ten percent of a battery life of the scanning device.

In yet another variation of this embodiment, the method further includes transmitting, from the scanning device, the notification to a device server; and routing, from the device server, the notification to the charging station.

In another embodiment, the present invention is a system for alerting a user to a device low battery state. The system includes a scanning device and a charging station, configured to be communicatively coupled with the scanning device by a wireless communication protocol. The charging station is further configured to receive a notification from the scanning device when the scanning device is not coupled to the charging station indicating that the scanning device has entered a low battery state, generate an indication of the low battery state of the scanning device based upon the notification, and display the indication for a user.

In a variation of this embodiment, the scanning device and the charging station are configured to be directly communicatively coupled by a wireless communication protocol.

In another variation of this embodiment, the system further includes a workstation configured to be communicatively coupled with the charging station. In this variation, the charging station is further configured to transmit the indication to the workstation, and the workstation is configured to display, on an interface of the workstation, the indication for the user. Further in this variation, the workstation is further configured to automatically present, on the interface of the workstation, an option for the user to activate a locationing feature of the scanning device.

In yet another variation of this embodiment, the indication includes at least one of (i) a visual indication component, (ii) an audio indication component, or (iii) a haptic indication component.

In still another variation of this embodiment, the low battery state corresponds to the scanning device having less than or equal to ten percent of a battery life of the scanning device.

In yet another variation of this embodiment, the system includes a device server communicatively coupled to the scanning device and the charging station. In this variation, the scanning device is further configured to transmit the notification to the device server, and the device server is configured to route the notification to the charging station.

In another embodiment, the present invention is a tangible machine-readable medium comprising instructions that, when executed, cause a machine to at least receive a notification from a scanning device that is communicatively coupled to a charging station by a wireless communication protocol, when from the scanning device is not coupled to the charging station, indicating that the scanning device has entered a low battery state; generate an indication of the low battery state of the scanning device based upon the notification; and display the indication for a user.

In a variation of this embodiment, the scanning device and the charging station are configured to be directly communicatively coupled by a wireless communication protocol.

In another variation of this embodiment, the instructions, when executed, further cause a machine to at least transmit the indication to a workstation of the user; display, on an interface of the workstation, the indication for the user; and automatically present, on the interface of the workstation, an option for the user to activate a locationing feature of the scanning device.

In yet another variation of this embodiment, the indication includes at least one of (i) a visual indication component, (ii) an audio indication component, or (iii) a haptic indication component.

In still another variation of this embodiment, the low battery state corresponds to the scanning device having less than or equal to ten percent of a battery life of the scanning device.

In yet another variation of this embodiment, the instructions, when executed, further cause a machine to at least receive the notification from a device server configured to route the notification from the scanning device to the charging station.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, users of cordless (e.g., battery powered) electronics devices desire that the devices have sufficient charge to accomplish all tasks involving the cordless electronic device during a work session. Many conventional cordless electronic devices include easy-to-use, and even contactless, charging options. However, these traditional charging systems suffer from a number of drawbacks, such as being unable to effectively notify a user that a cordless electronic device has entered a low battery state and should be charged.

The methods/systems of the present disclosure provide solutions to the notification problems associated with traditional charging systems. Namely, the methods/systems of the present disclosure alleviate problems associated with users neglecting to charge a cordless electronic device, resulting in the device losing/depleting any remaining battery charge. For example, a method of the present disclosure includes receiving, at a charging station for a scanning device, a notification from the scanning device when decoupled from the charging station indicating that the scanning device has entered a low battery state; generating, by the charging station, an indication of the low battery state of the scanning device based upon the notification; and displaying, by the charging station, the indication for a user. In this way, the disclosure of the present application reduces/eliminates the potential for harmful full discharges or extended periods of no charge that conventional cordless electronic device battery assembly charging systems allow. As a result, the methods/systems of the present disclosure maximize device uptime and increase overall battery performance and consumer satisfaction.

Figure 1:
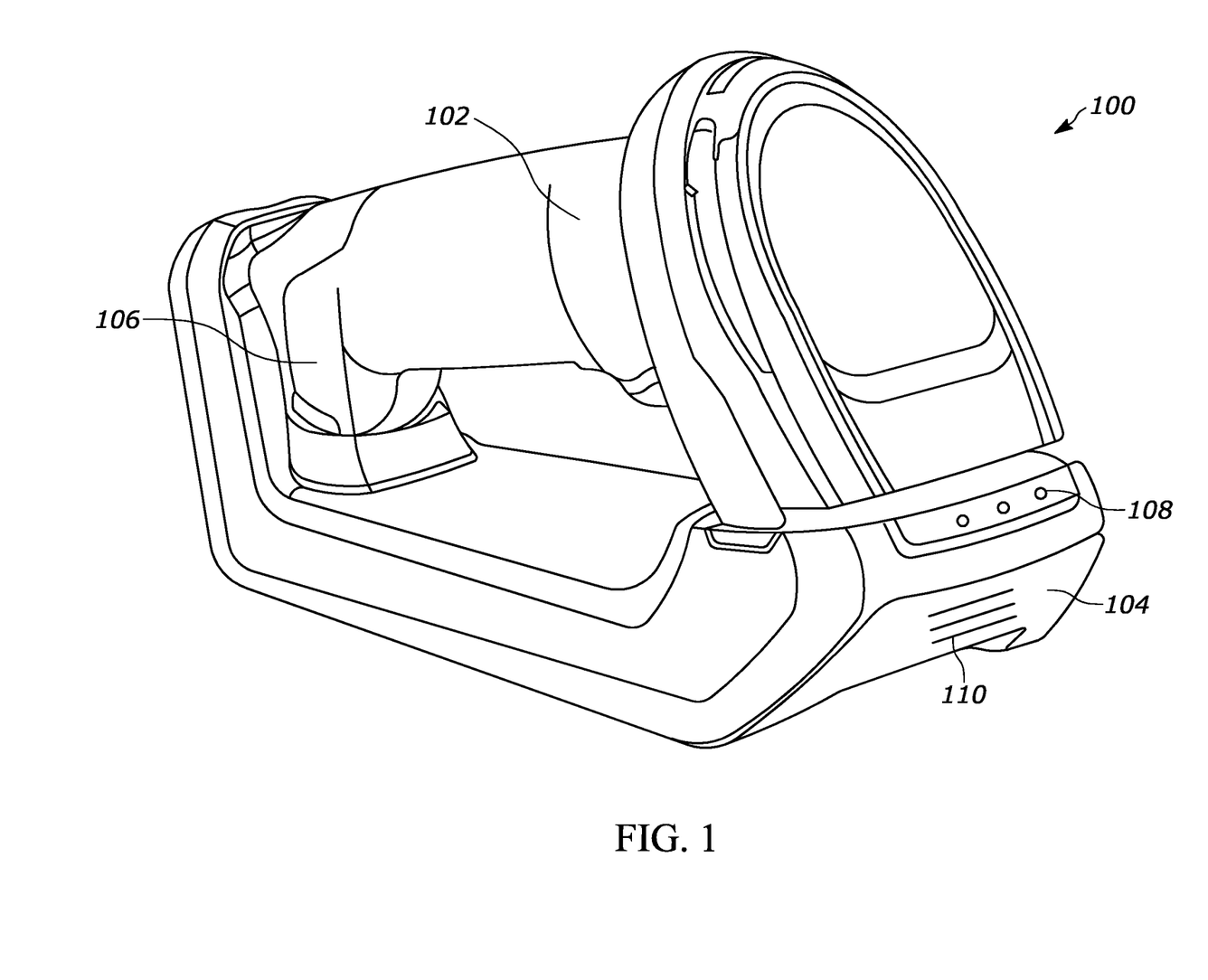
FIG. 1 is a perspective view of a scanning device and charging station used to facilitate alerting a user to a device low battery state, in accordance with various embodiments of the present invention.

Referring now to the drawings, FIG. 1 is a perspective view 100 of a scanning device 102 and charging station 104, in accordance with various embodiments of the present invention. The scanning device 102 includes a battery assembly 106. In various embodiments, the battery assembly 106 may include one or more of (i) lithium ion batteries, (ii) lithium ion super capacitors, and (iii) electrical double layer capacitor super capacitors.

The scanning device 102 is configured to decouple (not shown) from the charging station 104 for the purpose of, for example, capturing 1D or 2D images (e.g., barcodes). As an example, a user may grasp the scanning device 102, decouple (e.g., physically remove) it from the charging station 104, and thereafter aim the scanning device 102 at proximate objects for the purpose of capturing 1D or 2D images. The charging station 104 is configured to charge the battery assembly 106 while the scanning device 102 is coupled to the charging station 104. Alternatively, the charging station 104 may be integrated, wholly or in-part, into the scanning device 102 so that the scanning device 102 may not decouple from the charging station 104. For example, the charging station 104 may be a cable running from a power supply to the scanning device 102, or a standalone power supply wholly integrated into the scanning device 102.

As described further herein, the scanning device 102 may be communicatively coupled with the charging station 104 to transmit/receive notifications related to a low battery state of the scanning device 102. In some embodiments, for example, the scanning device 102 and the charging station 104 may be directly communicatively coupled by a wireless communication protocol (e.g., Bluetooth, WiFi, Bluetooth Low Energy (BLE), ZigBee, Z-Wave, Near Field Communication (NFC), Radio-Frequency Identification (RFID), 3G, 4G, 5G, etc.).

In this manner, the systems and methods of the present disclosure improve over conventional systems at least by providing a direct communication link between the scanning device and the charging station. Conventional systems typically rely on indirect communications (e.g., WAN-based communications) that require additional, third-party infrastructure to enable the communications. In situations where the third-party infrastructure is experiencing disruptions and/or is otherwise unavailable, low battery signals transmitted by scanning devices may fail to reach operators so that they may take corrective action. As a result, the scanning devices may fully discharge the battery assembly, causing potential damage to the battery assembly and forcing an operator to charge the scanning device prior to use. By contrast, the methods and systems of the present disclosure provide a direct communication link between the scanning device and the charging station (e.g., via a wireless communication protocol), thereby eliminating the issues associated with the indirect communications of conventional systems.

Moreover, the charging station 104 may also include a graphical display area 108 and an audio output device 110. The graphical display area 108 may include, as illustrated, three light-emitting diodes (LEDs) and/or any other suitable illumination device configured to illuminate in response to receiving a notification from the scanning device 102. Similarly, the audio output device 110 may include a speaker and/or any other suitable audio output device configured to generate an audio output in response to receiving a notification from the scanning device 102. For example, in response to the charging station 104 receiving a notification from the scanning device 102 of a low battery state (e.g., corresponding to the scanning device 102), the graphical display area 108 may illuminate all three LEDs and the audio output device 110 may generate an audio output to provide an indication to a proximate user that the scanning device 102 has entered a low battery state.

Of course, the charging station 104 may include instructions to illuminate the illumination components of the graphical display area 108 in any suitable manner (e.g., flashing, strobe, sequential illumination, increasing/decreasing intensity, etc.) and to generate audio outputs using the audio output device 110 in any suitable manner (e.g., constant output, modulating frequency, rotating through multiple audio outputs, increasing/decreasing intensity, etc.). The charging station 104 may also selectively utilize one or both of the graphical display area 108 and/or the audio output device 110 in response to receiving a notification from the scanning device 102. Further, it is to be understood that the graphical display area 108 and/or the audio output device 110 may include any suitable components, such as a graphical display, video output devices, etc. configured to alert a user in response to receiving a notification from the scanning device 102.

Figure 2:
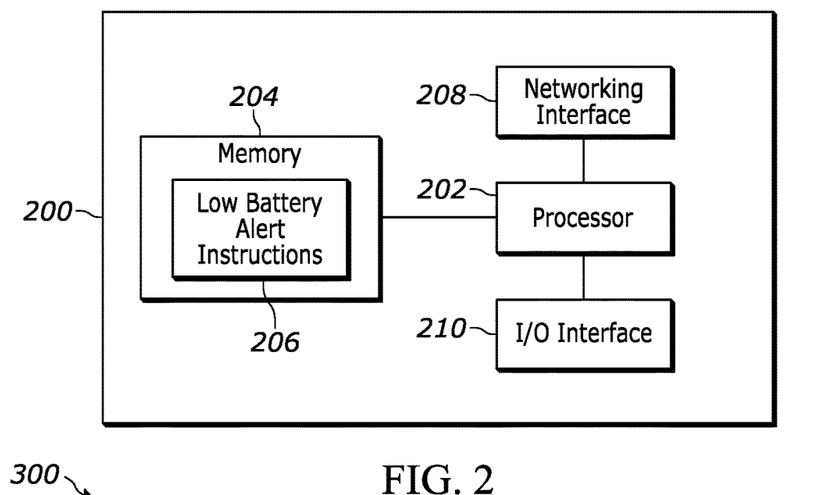
FIG. 2 is a block diagram representative of an example logic circuit capable of alerting a user to a device low battery state, in accordance with embodiments described herein.

FIG. 2 is a block diagram representative of an example logic circuit capable of implementing, for example, one or more components of the example charging station 104 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. The memory 204 also includes low battery alert instructions 206 that are accessible by the example processor 202. The low battery alert instructions 206 may comprise rule-based instructions, an artificial intelligence (AI) and/or machine learning-based model, and/or any other suitable algorithm architecture or combination thereof configured to determine a low battery state of a device (e.g., scanning device 102) and to generate an indication of the low battery state. For example, the example processor 202 may access the memory 204 to execute the low battery alert instructions 206 when a scanning device (e.g., scanning device 102) transmits a notification of a low battery state. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a network interface 208 to enable communication with other machines via, for example, one or more networks. The example network interface 208 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 200 of FIG. 2 also includes input/output (I/O) interfaces 210 to enable receipt of user input and communication of output data to the user. Such user input and communication may include, for example, any number of keyboards, mice, USB drives, optical drives, screens, touchscreens, etc.

Figure 3A:
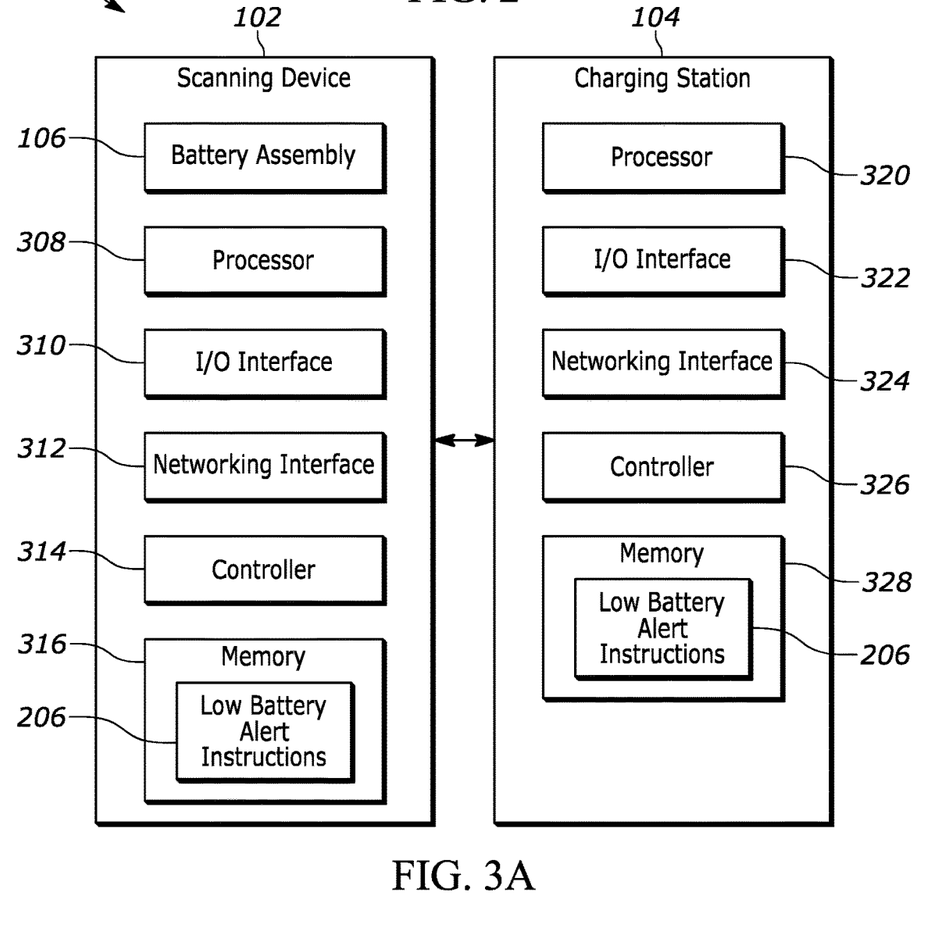
FIG. 3A illustrates an example system configured to alert a user to a device low battery state, in accordance with various embodiments of the present invention.

As illustrated in FIG. 3A, an example system 300 includes the scanning device 102 and the charging station 104. The scanning device 102 includes the battery assembly 106, a processor 308, an input/output (I/O) interface 310, a networking interface 312, a controller 314, and a memory 316. The memory 316 includes the low battery alert instructions 206. The charging station 104 includes a processor 320, an I/O interface 322, a networking interface 324, a controller 326, and a memory 328 that includes the low battery alert instructions 206. While referred to herein as a single "memory," a single "controller," and/or a single "processor," in some embodiments the memory (316, 328), controller (314, 326), and/or processor (308, 320), includes two or more memories, two or more controllers, and/or two or more processors.

In this example system 300, the scanning device 102 and the charging station 104 may be configured to communicate via the networking interfaces (312, 324) using any suitable communication protocol. As an example, the scanning device 102 may utilize a Bluetooth communication protocol to communicate with the charging station 104. The scanning device 102 may generally transmit notifications to the charging station 104 regarding, for example, the current charge status of the battery assembly 106. The charging station 104 may receive these notifications from the scanning device 102 and may transmit notifications and/or other signals back to the scanning device 102 in response. Additionally, the charging station 104 may initiate signal transmission to the scanning device 102 in response to a user input at the charging station 104 or based upon a predetermined notification event (e.g., a battery assembly charge check request, etc.). The scanning device 102 may also include one or more locationing features that enable the scanning device 102 to indicate a position of the scanning device 102 to the charging station 104 and/or any other connected devices.

Generally, the scanning device 102 may track the charge status of the battery assembly 106, and may transmit a notification to the charging station 104 if/when the charge status of the battery assembly 106 indicates a low battery charge state (also referenced herein as a "low battery state"). The scanning device 102 may check the charge status of the battery assembly 106 continuously and/or at predetermined intervals using the processor 308 executing the low battery alert instructions 206 to determine a current charge status. If the processor 308 determines that the current charge status of the battery assembly 106 indicates a low battery state, the low battery alert instructions 206 may cause the controller 314 to transmit a notification to the charging station 104 via the networking interface 312. Additionally or alternatively, the low battery alert instructions 206 may cause the controller 314 to store the determined low battery state in the memory 316 along with a time stamp indicating when the low battery state was determined and the corresponding notification to the charging station 104 was transmitted.

In some embodiments, the charging station 104 may initiate a battery assembly charge check request to determine whether the scanning device 102 should be charged. Generally, if the charging station 104 (e.g., via the processor 320) determines that a scanning device (e.g., scanning device 102) has been disconnected from the charging station 104 for a predetermined amount of time, the charging station 104 may assume that the scanning device should be charged. The charging station 104 may record in memory 328 each time and/or a predetermined number of recent times when a scanning device was connected/disconnected from the charging station 104. Moreover, the controller 326 may cause the processor 320 to execute the low battery alert instructions 206 continuously and/or at predetermined intervals to determine when a scanning device 102 has been disconnected from the charging station 104 longer than a predetermined amount of time such that the low battery alert instructions 206 may further instruct the processor 320 to generate a battery assembly charge check request.

For example, in these embodiments, the charging station 104 may transmit the battery assembly charge check request to the scanning device 102, which in turn, may check the charge status of the battery assembly 106 using the processor 308 executing the low battery alert instructions 206 to determine a current charge status. The processor 308 may determine that the current charge status of the battery assembly 106 indicates a low battery state, and in response, the low battery alert instructions 206 may cause the controller 314 to transmit a notification indicating the low battery state to the charging station 104 via the networking interface 312. Alternatively, the processor 308 may determine that the current charge status of the battery assembly 106 does not indicate a low battery state, and in response, the low battery alert instructions 206 may cause the controller 314 to transmit a notification indicating that the current charge status does not correspond to a low battery state to the charging station 104 via the networking interface 312. Moreover, in various embodiments, the controller 314 may determine the current charge status of the battery assembly 106, and transmit the current charge status to the charging station 104 via the networking interfaces (312, 324). The low battery alert instructions 206 may then cause the controller 326 to instruct the processor 320 to determine whether or not the current charge status of the battery assembly 106 indicates a low battery state.

Additionally or alternatively, the scanning device 102 and/or the charging station 104 may communicate directly with an external server to accomplish some/all of the actions described herein. Moreover, the scanning device 102 and/or the charging station 104 may communicate with a user workstation to notify a user directly of, for example, a low battery state of the scanning device 102. In this manner, the systems of the present disclosure may maximize processing resource efficiency and may more effectively communicate low battery states to relevant users than conventional systems.

Figure 3B:
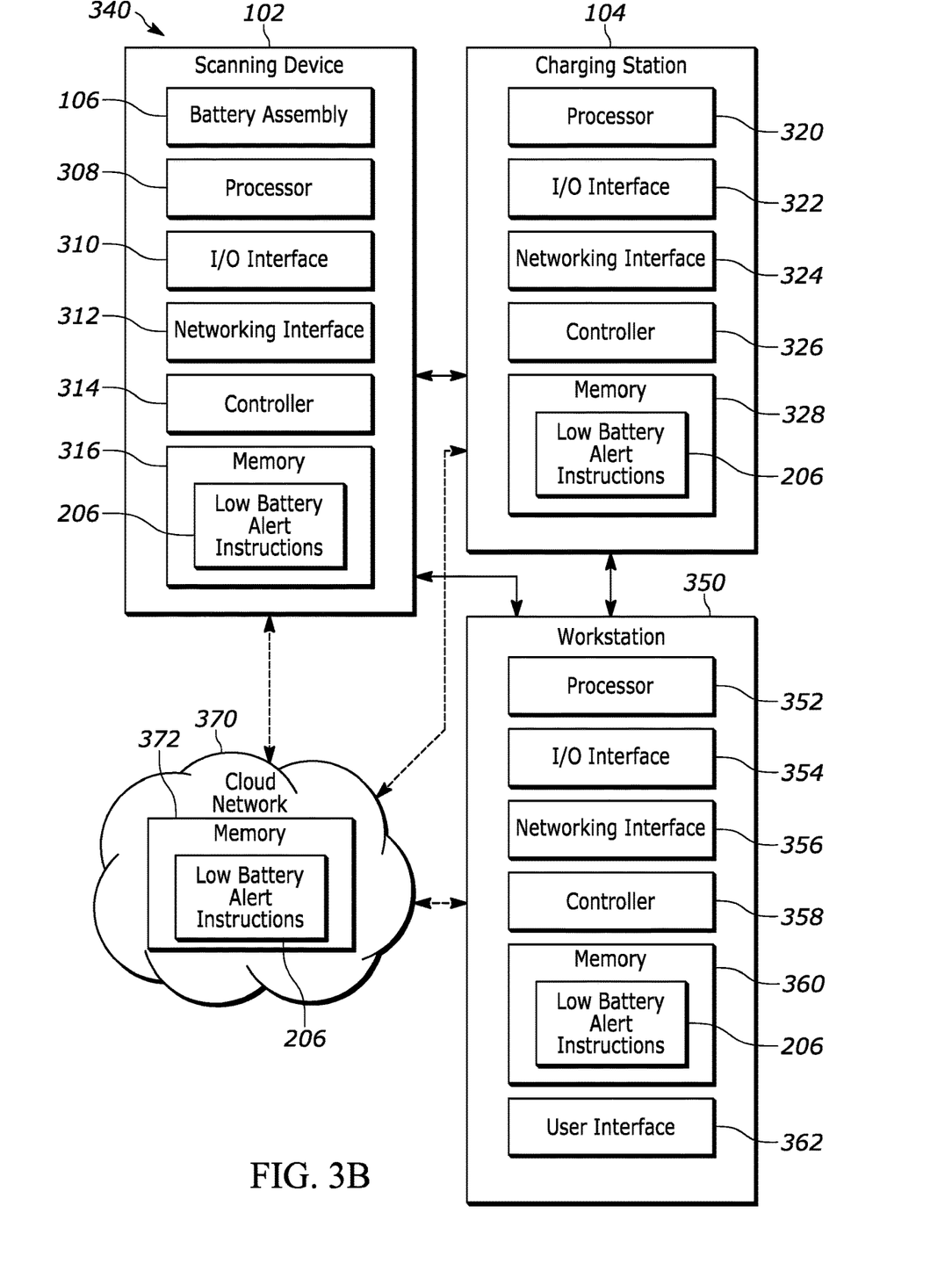
FIG. 3B illustrates another example system configured to alert a user to a device low battery state, in accordance with various embodiments of the present invention.

Accordingly, and in reference to FIG. 3B, an example system 340 of the present application may include the scanning device 102, the charging station 104, a workstation 350, and a cloud network 370 (also referenced herein as a "device server"). The workstation 350 may be a portable and/or stationary user workstation that a user may interface with directly to analyze and/or control the performance of any of the devices discussed herein. The workstation 350 includes a processor 352, an I/O interface 354, a networking interface 356, a controller 358, a memory 360 that includes the low battery alert instructions 206, and a user interface 362. The cloud network 370 may include a memory 372 including at least the low battery alert instructions 206 and may be configured to execute the low battery alert instructions 206. Of course, it is to be appreciated that the cloud network 370 may be any suitable cloud-based and/or other remote server configured to perform some/all of the actions described herein. Each of the scanning device 102, the charging station 104, the workstation 350, and the cloud network 370 may be communicatively coupled to one another, and may share information (e.g., current charge status, notifications of low battery state, etc.) to quickly and efficiently determine a low battery state corresponding to the scanning device 102 and/or any other coupled device.

The scanning device 102 may continuously and/or periodically communicate with one or more of the charging station 104, the workstation 350, and/or the cloud network 370 to transmit/receive notifications (e.g., current charge status, etc.). For example, the scanning device 102 may periodically check the current charge status of the battery assembly 106 in accordance with the low battery alert instructions 206, and may transmit the current charge status and/or a determination of whether or not the current charge status indicates a low battery state to the cloud network 370 for storage and/or further processing. If the cloud network 370 receives an indication of a low battery state corresponding to the scanning device 102 and/or determines that the current charge status of the battery assembly 106, received from the scanning device 102, indicates a low battery state corresponding to the scanning device 102, the cloud network 370 may generate a notification for transmission to the scanning device 102, the charging station 104, and/or the workstation 350.

As an example, the scanning device 102 may periodically, in accordance with the low battery alert instructions 206, check the current charge status of the battery assembly 106. In this example, the scanning device 102 determines, via the processor 308, that the current charge status of the battery assembly 106 indicates a low battery state. The scanning device 102 may then transmit a notification of the low battery state to the cloud network 370 for storage and dissemination to the charging station 104 and the workstation 350. The cloud network 370 may then store some/all of the notification (e.g., a timestamp, the current charge status, etc.) in memory 372, and may then, in accordance with the low battery alert instructions 206, transmit the notification and/or an indication of the notification to the charging station 104 and/or the workstation 350.

The charging station 104 and/or the workstation 350 may receive the notification and/or the indication of the notification from the cloud network 370, and may display the notification and/or indication to a user. For example, the charging station 104 may output illumination and/or audio output(s) (e.g., via the graphical display area 108 and/or the audio output device 110), and the workstation may display a graphical rendering of the notification and/or indication via the user interface 362. The illumination and/or audio output(s) generated by the charging station 104 may signal to a nearby user that a device (e.g., the scanning device 102) requires charging, and the audio output(s) may additionally include identifying information corresponding to the charging device to enable a user to locate and identify the particular scanning device indicated (e.g., location of the scanning device, device type, etc.). The graphical rendering displayed on the user interface 362 of the workstation 350 may display a location of the scanning device on a map layout of the working environment (e.g., an overhead map layout of a warehouse) and may additionally indicate identifying information corresponding to the charging device. Of course, the workstation 350 may also output illumination and/or audio output(s), similar to the charging station 104, via the I/O interface 354 and/or the user interface 362.

As another example, the scanning device 102 may continuously, in accordance with the low battery alert instructions 206, check the current charge status of the battery assembly 106. In this example, the scanning device 102 determines, via the processor 308, that the current charge status of the battery assembly 106 indicates a low battery state. The scanning device 102 may then transmit a notification of the low battery state to the charging station 104 for storage, dissemination to the cloud network 370 and the workstation 350, and display of an indication of the notification to a user. The charging station 104 may then store some/all of the notification (e.g., a timestamp, the current charge status, etc.) in memory 328, and may then, in accordance with the low battery alert instructions 206, transmit the notification and/or an indication of the notification to the cloud network 370 and/or the workstation 350.

The cloud network 370 and/or the workstation 350 may receive the notification and/or the indication of the notification from the charging station 104, and may again store the notification in memory (360, 372). Moreover, the charging station 104 and/or the workstation 350 may display the notification and/or indication to a user, as previously described.

Further, it is to be understood that the workstation 350 may receive the current charge status of the battery assembly 106 and/or a notification of a low battery state from the scanning device 102. The workstation 350 may thereafter store the notification/indication in memory 360, disseminate the notification/indication to the charging station 104 and/or the cloud network 370, and display of the notification/indication to a user (e.g., via I/O interface 354, user interface 362), as previously described.

Figure 4:
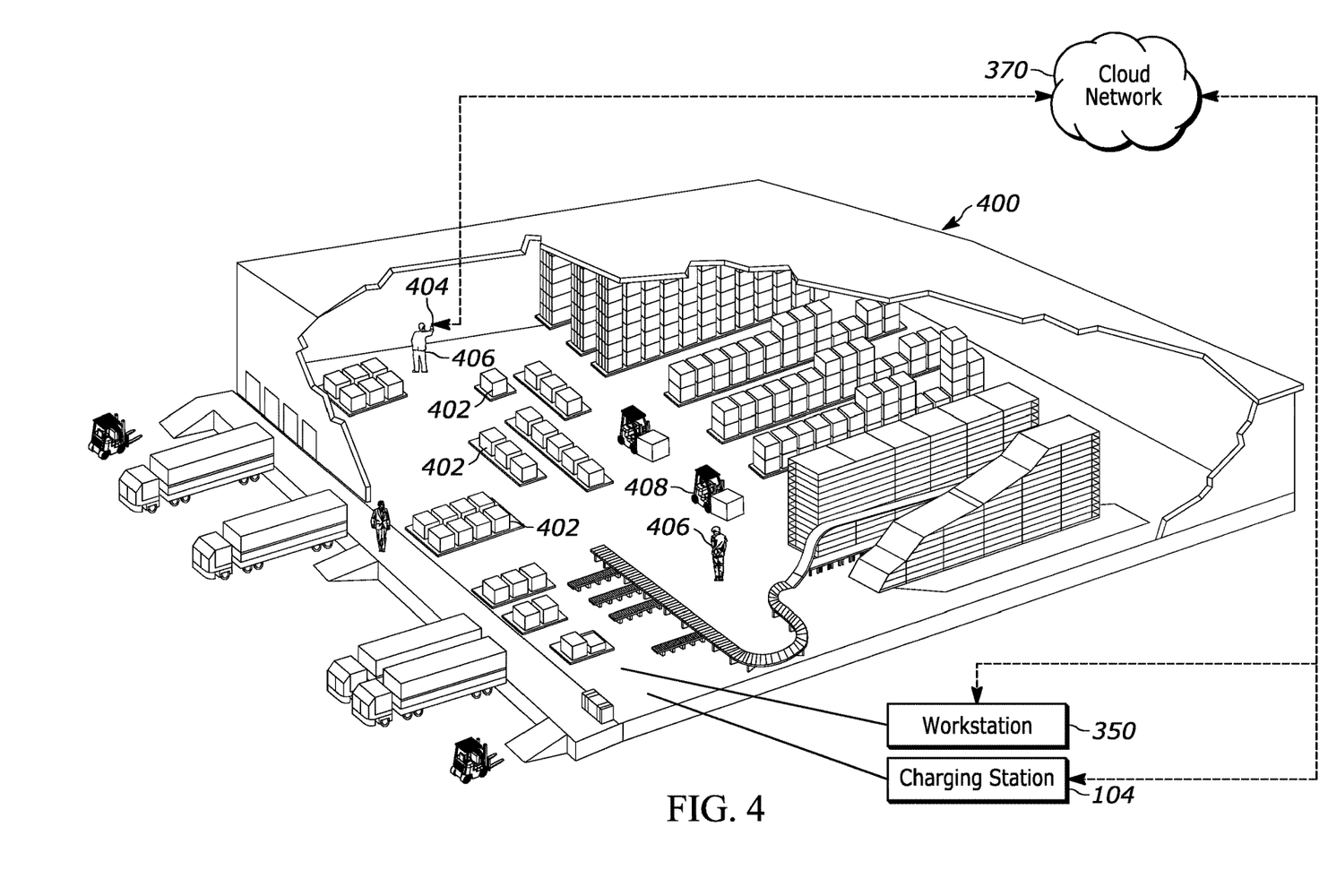
FIG. 4 illustrates an example venue in the form of a warehouse in which the example systems of FIGS. 3A and 3B may alert a user to a device low battery state.

To illustrate the example system 340, FIG. 4 depicts an example venue 400 in the form of a warehouse in which movable products 402, shown in FIG. 4 as cuboid cartons for simplicity, may be located, tracked, scanned, etc. using the devices/systems described herein. The venue 400 may be any indoor or outdoor venue, and may have any layout or configuration. Although the example venue 400 is illustrated as a warehouse, the disclosed embodiments may be implemented at other types of venues (such as a retail store, an airport, a stadium, a performance center, a school, a hospital, etc.).

Generally speaking, FIG. 4 illustrates how knowing the current charge status of a scanning device 404 is important for any shipping or storage industry. During the course of a typical day inside a warehouse or other storage facility (e.g., venue 400), many movable products 402 may be added, removed, and/or otherwise relocated within or outside of the storage facility. These moveable products 402 may be scanned upon entry, and may be scanned prior to loading on a transport vehicle. However, if any moveable products 402 are not scanned upon entry/exit and are thereby erroneously stored or placed on a transport vehicle (e.g., trailer truck), this can delay shipments containing a multitude of moveable products 402. As a result, failing to adequately charge scanning devices and/or otherwise allowing scanning devices (e.g., scanning device 404) to deplete the battery charge of a battery assembly (e.g., battery assembly 106) can increase shipping times and costs and decrease worker productivity as workers 406 search to locate the depleted scanning device 404 and wait for the battery charge to replenish before scanning additional moveable products 402.

For example, as a moveable product 402 is transported by a forklift 408 or worker 406 from one location to another, a worker 406 may utilize a scanning device 404 to scan the moveable product 402 (e.g., via barcode scanning, OCR, QR code recognition, etc.) before the moveable product 402 is placed within the venue 400 for storage and/or placed on a transport vehicle for shipment elsewhere. The worker 406 may then place the scanning device 404 at a location within the venue 400 (e.g., near the moveable product 402) and return to the worker's 406 workstation 350, located proximate to the charging station 104. The scanning device 404 may deplete a portion of the charge remaining in the battery assembly while the worker 406 is performing other tasks at the workstation 350, such that the scanning device 404 may have an insufficient amount of battery charge to perform scanning functions when the worker 406 returns to use the scanning device 404. To avoid this problem, the scanning device 404 may (e.g., by executing the low battery alert instructions 206), for example, determine a current charge status of the battery assembly of the scanning device 404, and transmit a notification of the current charge status to the charging station 104 indicating that the scanning device 404 has entered a low battery state. The charging station 104 may then display an indication of the low battery state for the proximate worker 406 working at the workstation 350. Of course, the charging station 104 may also transmit the indication to the workstation 350 for display to the worker 406 via a user interface (e.g., user interface 462) of the workstation 350. In this manner, the worker 406 may receive the indication of the low battery state of the scanning device 404, and may take appropriate actions to charge the scanning device 404.

For example, the worker 406 may activate a locationing feature of the scanning device 404 to help the worker 406 locate the scanning device 404. The workstation 350 may prompt the worker 406 to activate the locationing feature of the scanning device 404, and in response to the worker 406 selecting an option to activate the locationing feature, the workstation 350 may display and/or otherwise indicate the location of the scanning device 404 as a result of the locationing feature(s) of the scanning device 404. The locationing feature may include, for example, a graphical rendering of an overhead map display of the venue 400 including an indicator that represents the scanning device 404 at a location within the venue 400. This graphical rendering may be generated by the workstation 350, and displayed on the user interface of the workstation 350. Additionally or alternatively, the locationing feature may include audio/visual cues from the scanning device 404 (e.g., a constant or repeating audio tone, constant or flashing illumination, etc.) and/or any other connected device(s) or combinations thereof.

Moreover, as previously mentioned, each of the scanning device 404, the workstation 350, and/or the charging station 104 may be in wired, wireless, direct, or networked communication with the cloud network 370, for example, through a network switch. Thus, each of the scanning device 404, the workstation 350, and the charging station 104 may communicate through any suitable short-range communication protocol (e.g., WiFi, BLE, etc.), and/or may communicate with each other and/or the cloud network 370 through any suitable long-range communication protocol (e.g., via the Internet, etc.).

Figure 5:
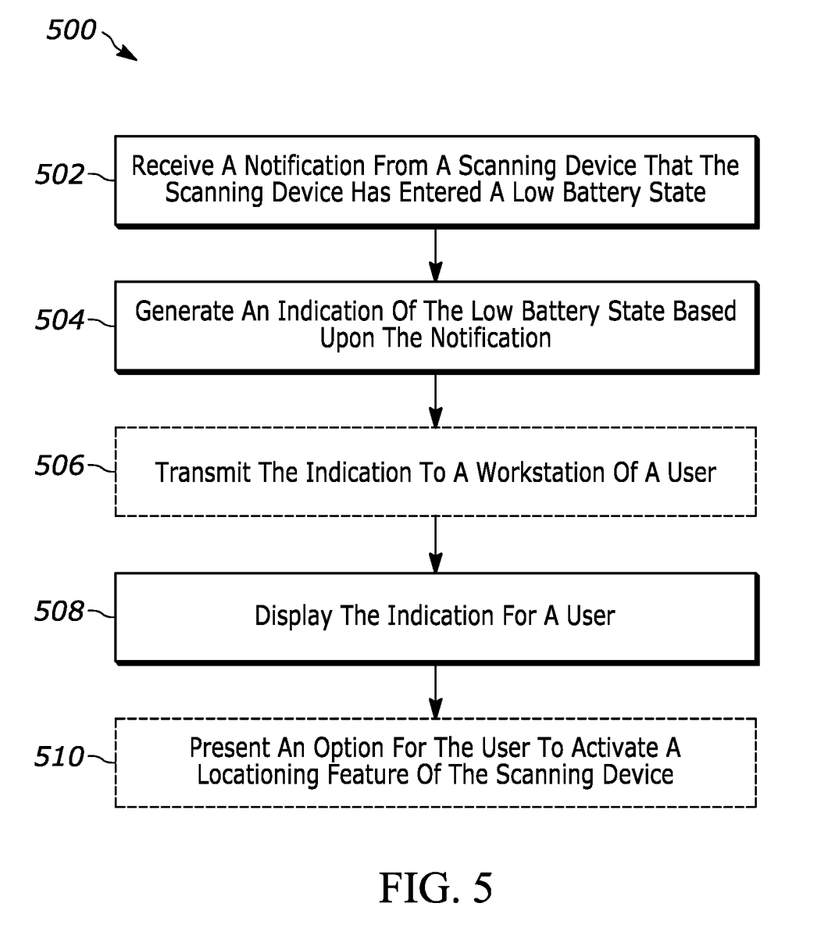
FIG. 5 illustrates an example method for alerting a user to a device low battery state, in accordance with various embodiments of the present invention.

FIG. 5 illustrates an example method 500 alerting a user to a device low battery state, in accordance with various embodiments of the present invention. It should be understood that, in certain embodiments, any of the blocks of the method 500 may be performed by any of the scanning device 102, the charging station 104, the workstation 350, the cloud network 370, and/or any other suitable device. Moreover, certain blocks of the method 500 may be optional (e.g., blocks 506, 510).

The method 500 begins at block 502, where, for example, a charging station (e.g., charging station 104) receives a notification from a scanning device (e.g., scanning device 102) when decoupled from the charging station indicating that the scanning device has entered a low battery state. In some embodiments, the scanning device and the charging station are communicatively coupled by a wireless communication protocol. For example, and as previously mentioned, the scanning device and the charging station may be communicatively coupled via Bluetooth, WiFi, BLE, ZigBee, Z-Wave, NFC, RFID, 3G, 4G, 5G, and/or any other suitable communication protocol or combinations thereof.

In some embodiments, the low battery state corresponds to the scanning device having less than or equal to a battery threshold value of a battery life of the scanning device. The battery threshold value may be equivalent to, for example, ten percent of the total battery life of the scanning device. Thus, if the total battery life of the scanning device corresponds to five hours of operation, the battery threshold value may correspond to when the scanning device battery assembly (e.g., battery assembly 106) has a current charge status corresponding to thirty minutes or less of operation of the scanning device. Of course, it is to be understood that the battery threshold value may be any suitable value, such as five percent of total battery life, twenty percent of total battery life, fifty percent of total battery life, etc.

In some embodiments, the scanning device may additionally or alternatively transmit the notification to a device server (e.g., cloud network 370). Thereafter, the device server may route the notification to the charging station. The charging station may also receive the notification from the scanning device and thereafter route the notification to the device server. In either case, the charging station and/or the device server may store the notification in memory prior to or after routing/transmitting the notification to the charging station/device server.

At block 504, the method 500 includes generating an indication of the low battery state based upon the notification. The charging station may generate the indication of the low battery state, and the indication may correspond to instructions that result in the charging station indicating the low battery state to a user. For example, the indication may instruct the charging station to illuminate an illumination component (e.g., graphical display area 108), generate audio using an audio component (e.g., audio output device 110), and/or any other suitable output (e.g., via I/O interface 322).

In some embodiments, the indication includes at least one of (i) a visual indication component, (ii) an audio indication component, or (iii) a haptic indication component. For example, the charging station (e.g., charging station 104) may generate the indication, in part, by including instructions to illuminate a graphical display area (e.g., graphical display area 108) in any suitable manner. The charging station may also generate the indication, in part, by including instructions to output an audio cue/signal (e.g., via audio output device 110) in any suitable manner. Further, the charging station may generate the indication, in part, by including instructions to vibrate/shake the charging station, the scanning device, the workstation, and/or any other connected device in any suitable manner (e.g., via a vibration motor included within the connected device).

At optional block 506, the method 500 may include transmitting the indication to a workstation of the user. As previously mentioned, the user (e.g., worker 406) may carry or otherwise interact with a workstation (e.g., workstation 350) during a work session, and as a result, may not be proximate to the scanning device (e.g. scanning device 102, 404) or the charging station (e.g., charging station 104). Thus, in some embodiments, the charging station may transmit the indication to the workstation to increase the potential for a user to receive the indication. Moreover, in some embodiments, the scanning device may transmit the notification to a device server (e.g., cloud network 370), and in those embodiments, the device server may generate and transmit the indication to the charging station and/or the workstation.

At block 508, the method 500 may include displaying the indication for a user. The charging station may execute the instructions included as part of the indication to, for example, illuminate some/all of a graphical display (e.g., graphical display area 108), output an audio cue/signal (e.g., via audio output device 110), vibrate/shake the charging station (e.g., via a vibration motor included within the charging station), and/or any other suitable display. For example, the charging station 104 may display the indication of a low battery state corresponding to the scanning device 102, 404 by simultaneously illuminating some/all of the illumination components of the graphical display area 108, outputting an audio cue/signal through the audio output device 110, and by engaging a vibration motor to shake/vibrate the charging station 104.

As previously mentioned, displaying the indication for the user may further include transmitting the indication to a workstation (e.g., workstation 350) of a user, and displaying the indication for the user on an interface (e.g., user interface 362) of the workstation. Further in these embodiments, and at optional block 510, the method 500 may include the workstation (e.g., executing the low battery alert instructions 206), as part of displaying the indication, automatically presenting an option for the user to activate a locationing feature of the scanning device. For example, the workstation may graphically display the indication of the low battery state of the scanning device to a user on the user interface. The workstation may also present the user with an option to toggle on a locationing feature of the scanning device, such as the scanning device emitting an audio cue/signal and/or illuminating an illumination component to enable the user to locate the scanning device.

Further, the scanning device may transmit a relative location of the scanning device with respect to the workstation and/or the charging station indicating, for example, that the scanning device is twenty feet from the workstation, to allow the user to understand where the scanning device is compared to the user's current location. Moreover, as another example, the scanning device may transmit an absolute position of the scanning device within a venue (e.g., venue 400) to allow the workstation, the device server, the charging station, and/or any other suitable device to determine the location of the scanning device. In this example, the workstation may display an overhead perspective map of the venue that includes indicators for the location of the scanning device, the workstation, the charging station, and/or any other suitable device(s) or combinations thereof.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for alerting a user to a device low battery state, the method comprising:
   receiving, at a charging station for a device, a notification from the device when the device is not coupled to the charging station indicating that the device has entered a low battery state, wherein the device and the charging station are communicatively coupled by a wireless communication protocol;
   generating, by the charging station, an indication of the low battery state of the device based upon the notification; and
   displaying, by the charging station, the indication for a user.

2. The method of claim 1, wherein the device and the charging station are directly communicatively coupled by a wireless communication protocol.

3. The method of claim 1, wherein displaying the indication for the user further comprises:
   transmitting, by the charging station, the indication to a workstation of the user; and
   displaying, on an interface of the workstation, the indication for the user.

4. The method of claim 3, wherein displaying the indication for the user on the interface of the workstation further comprises:
   automatically presenting, on the interface of the workstation, an option for the user to activate a locationing feature of the device.

5. The method of claim 1, wherein the indication includes at least one of (i) a visual indication component, (ii) an audio indication component, or (iii) a haptic indication component.

6. The method of claim 1, wherein the low battery state corresponds to the device having less than or equal to a battery threshold value of a battery life of the device.

7. The method of claim 1, further comprising:
   transmitting, from the device, the notification to a device server; and
   routing, from the device server, the notification to the charging station.

8. A system for alerting a user to a device low battery state, the system comprising:
   a device; and
   a charging station, configured to be communicatively coupled with the device by a wireless communication protocol, wherein the charging station is further configured to:
   receive a notification from the device when from the device is not coupled to the charging station indicating that the device has entered a low battery state;
   generate an indication of the low battery state of the device based upon the notification; and
   display the indication for a user.

9. The system of claim 8, wherein the device and the charging station are configured to be directly communicatively coupled by a wireless communication protocol.

10. The system of claim 8, further comprising a workstation configured to be communicatively coupled with the charging station,
    wherein the charging station is further configured to transmit the indication to the workstation, and
    wherein the workstation is configured to display, on an interface of the workstation, the indication for the user.

11. The system of claim 10, wherein the workstation is further configured to:
    automatically present, on the interface of the workstation, an option for the user to activate a locationing feature of the device.

12. The system of claim 8, wherein the indication includes at least one of (i) a visual indication component, (ii) an audio indication component, or (iii) a haptic indication component.

13. The system of claim 8, wherein the low battery state corresponds to the device having less than or equal to a battery threshold value of a battery life of the device.

14. The system of claim 8, further comprising a device server communicatively coupled to the device and the charging station,
    wherein the device is further configured to transmit the notification to the device server; and
    wherein the device server is configured to route the notification to the charging station.

15. A tangible machine-readable medium comprising instructions that, when executed, cause a machine to at least:
    receive a notification from a device that is communicatively coupled to a charging station by a wireless communication protocol, when the device is not coupled to the charging station, indicating that the device has entered a low battery state;
    generate an indication of the low battery state of the device based upon the notification; and
    display the indication for a user.

16. The tangible machine-readable medium of claim 15, wherein the device and the charging station are configured to be directly communicatively coupled by a wireless communication protocol.

17. The tangible machine-readable medium of claim 15, wherein the instructions, when executed, further cause a machine to at least:
    transmit the indication to a workstation of the user;
    display, on an interface of the workstation, the indication for the user; and
    automatically present, on the interface of the workstation, an option for the user to activate a locationing feature of the device.

18. The tangible machine-readable medium of claim 15, wherein the indication includes at least one of (i) a visual indication component, (ii) an audio indication component, or (iii) a haptic indication component.

19. The tangible machine-readable medium of claim 15, wherein the low battery state corresponds to the device having less than or equal to a battery threshold value of a battery life of the device.

20. The tangible machine-readable medium of claim 15, wherein the instructions, when executed, further cause a machine to at least:
   receive the notification from a device server configured to route the notification from the device to the charging station.

* * * * *